(12) United States Patent
Loeschner et al.

(10) Patent No.: US 8,545,186 B2
(45) Date of Patent: Oct. 1, 2013

(54) BEARING ARRANGEMENT OF A ROTOR HUB FOR A WIND POWER PLANT, AND METHOD FOR MOUNTING THE SAME

(75) Inventors: Tim Loeschner, Wuerzburg (DE); Rudolf Zeidlhack, Werneck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 625 days.

(21) Appl. No.: 12/682,118

(22) PCT Filed: Oct. 7, 2008

(86) PCT No.: PCT/DE2008/001655
§ 371 (c)(1),
(2), (4) Date: Aug. 6, 2010

(87) PCT Pub. No.: WO2009/046707
PCT Pub. Date: Apr. 16, 2009

(65) Prior Publication Data
US 2010/0296763 A1      Nov. 25, 2010

(30) Foreign Application Priority Data
Oct. 9, 2007   (DE) .......................... 10 2007 048 377

(51) Int. Cl.
*F03D 1/06*      (2006.01)
*F03D 11/04*     (2006.01)

(52) U.S. Cl.
USPC ...................................... 416/244 R

(58) Field of Classification Search
USPC ................. 384/542, 559, 537, 584, 585, 586, 384/587, 588; 416/244 R, 245 R; 415/4.5, 415/4.3; 29/898.06
See application file for complete search history.

(56) References Cited

U.S. PATENT DOCUMENTS

| | | | |
|---|---|---|---|
| 1,347,522 A * | 7/1920 | Root | 384/588 |
| 4,757,211 A | 7/1988 | Kristensen | |
| 5,663,600 A | 9/1997 | Baek et al. | |
| 6,872,049 B2 * | 3/2005 | Christensen | 415/124.1 |
| 7,084,522 B2 * | 8/2006 | Wobben | 290/55 |
| 2007/0075548 A1 * | 4/2007 | Bagepalli et al. | 290/55 |

FOREIGN PATENT DOCUMENTS

DE          103 51 524 A       8/2004

* cited by examiner

*Primary Examiner* — Nathaniel Wiehe
*Assistant Examiner* — Brian O Peters
(74) *Attorney, Agent, or Firm* — Lucas & Mercanti, LLP

(57) ABSTRACT

A bearing arrangement of a rotor for a wind power plant. The bearing arrangement includes a rotor hub with at least one rotor blade, and a rolling bearing, by which the rotor hub is mounted in a gondola of the wind power plant so as to be rotatable relative to a machine support. The rolling bearing has an external ring and an internal ring, between which rolling elements are arranged. In order to make it easier to mount and dismount the bearing arrangement, the rolling bearing is coaxially disposed in a cylindrical opening of the rotor hub, which is externally open in an axial direction, and the external ring of the rolling bearing is connected to the rotor hub in a rotationally fixed and releasable manner.

6 Claims, 2 Drawing Sheets

BEARING ARRANGEMENT OF A ROTOR HUB FOR A WIND POWER PLANT, AND METHOD FOR MOUNTING THE SAME

This application is a 371 of PCT/DE2008/001655 filed Oct. 7, 2008, which in turn claims the priority of DE 10 2007 048 377.7 filed Oct. 9, 2007, the priority of both applications is hereby claimed and both applications are incorporated by reference herein.

FIELD OF THE INVENTION

The invention relates to a bearing arrangement of a rotor of a wind power plant, composed of a rotor hub with at least one rotor blade, and of a roller bearing by means of which the rotor hub is mounted so as to be rotatable with respect to a machine carrier in a gondola of the wind power plant, wherein the roller bearing has an external ring and an internal ring, between which roller bodies are arranged. The invention also relates to a method for replacing such a bearing arrangement of a wind power plant.

BACKGROUND OF THE INVENTION

The rotor of a wind power plant is usually supported in a main bearing which bears the rotor shaft. This shaft is provided for transmitting the output energy to an input shaft of a gear mechanism. The bearing of the rotor shaft is usually provided by means of a fixed/free-moving bearing system with at least two roller bearings. However, this design requires a large installation space and is relatively expensive.

Bearing arrangements of wind power plants in which only a single roller bearing is used as a bearing arrangement which can transmit all the forces and torques are already known. This solution is more cost-effective and takes up less installation space. For repair work on the main bearing or to change the bearing in a wind power plant it is generally necessary to remove the rotor. In view of the fact that more recent plants are installed on towers with heights over 100 m this is an enormous cost factor.

A bearing arrangement of this type is known, for example, from DE 101 02 255 A1. This document describes a wind power plant having a machine carrier which is to be attached to the top of a tower and which holds, on the one hand, the static part of an electric generator and, on the other hand, supports the rotating part of the latter as well as a hub of a rotor which bears rotor blades, wherein the rotor hub and the rotating generator part are attached to a common hollow shaft which is seated, by means of roller bearings, on an axle sleeve which is mounted on the machine carrier. There is provision here that a single bearing, which also takes up torques, is provided as the roller bearing means between the axle sleeve and the hollow shaft. This is claimed to reduce considerably the axial length of the axle sleeve and therefore its weight, and this also applies to the part of the hollow shaft which serves as the bearing system. In this context, the bearing is claimed to take up all the torques which also change in direction and which occur about axes which run transversely with respect to the axis of the shaft, without changing the relative position of the generator-rotor with respect to the generator-stator beyond a critical degree.

EP 1 426 639 A1 discloses a method for mounting a two-row tapered rolling bearing as a roller bearing of a wind power plant, which method is defined by the fact that the segments of a first internal ring and the segments of a second internal ring are positioned close to one another with their axial end sides facing one another, in such a way that at a time at which all the segments of the external ring just come to bear against the bore face and all the segments of the first and second internal ring just come to bear against the casing face of the shaft, an axial gap remains between the axial end faces of the segments of the first and second internal rings. Basically, the mounting of a segmented bearing is advantageous in terms of ease of mounting, but the division leads to virtually unavoidable inhomogeneity in the raceways of the roller bearing.

Finally, DE 103 51 524 A1 discloses an arrangement for transmitting rotor bending torques and rotor torques for a wind power plant which has a rotor hub with at least one rotor blade attached thereto as well as a large-diameter roller bearing which supports the rotor, said large-diameter roller bearing being, in particular, a tapered roller bearing with an external ring which is fixed to the housing and with a planetary gear mechanism which is connected downstream. In this arrangement there is provision for the hub to be connected directly to the internal ring of the radial bearing and/or to a bearing reinforcement ring. This is claimed to provide a particularly compact, lightweight and cost-effective arrangement for transmitting the rotor bending torques and torques via a large-diameter roller bearing and a gear mechanism.

All the solutions with a single main bearing of the rotor have the disadvantage that when it is necessary to replace the bearings this can only be done so with a large degree of expenditure in terms of machinery and work, and this is due in particular to the fact that the roller bearings have to be pulled off in the rearward direction, that is to say in the direction of the interior of the gondola of the wind power plant. This makes it necessary to open the gondola, remove claddings, and uninstall assemblies and machine components and the like which are in the way, which is a dangerous and particularly equipment-intensive activity at a height off the ground of up to 100 m since, under certain circumstances, several cranes and lifting platforms have to be used for this maintenance work.

OBJECT OF THE INVENTION

Starting from the stated disadvantages of the solutions of the known prior art, the invention is therefore based on the object of providing a bearing arrangement and a method for mounting the same which overcome the described disadvantages. In particular, a bearing arrangement of a wind power plant is to be made available which is simple to mount and to dismount. In particular, a method is to be specified for replacing the bearing arrangement.

DESCRIPTION OF THE INVENTION

The invention is based on the realization that the defined object can be achieved by virtue of the fact that the roller bearing of the bearing arrangement is inserted from the front, that is to say on the side away from the generator, into an opening in the rotor hub with a larger diameter, and is connected thereto.

The invention is therefore based on a bearing arrangement of a rotor of a wind power plant, composed of a rotor hub with at least one rotor blade, and of a roller bearing by means of which the rotor hub is mounted so as to be rotatable with respect to a machine carrier in a gondola of the wind power plant, wherein the roller bearing has an external ring and an internal ring, between which roller bodies are arranged. In addition there is provision that the roller bearing is arranged coaxially in an axially externally open cylindrical opening in the rotor hub, wherein the external ring of the roller bearing is connected to the rotor hub in a rotationally fixed and releasable fashion.

This design advantageously ensures that the mounting and/or dismounting of the roller bearing of the bearing arrangement is drastically simplified. If the roller bearing is to be removed from the wind power plant for maintenance purposes or replacement purposes, it is sufficient to remove the roller bearing in the forward direction out of the rotor hub. Complex work within the gondola or on the components installed therein is eliminated entirely, since all the significant components are accessible from the outside, that is to say from the front on the side away from the generator. Furthermore, the functional capability of the roller bearing and/or of the rotor of the wind power plant is not adversely affected by this in any way.

Furthermore it may be provided that the rotor hub has, at an axially inner end of the cylindrical opening, a radially inwardly protruding flange with an axially outer end side, and that an axially inner end side of the external ring bears against the axially outer end side of the flange and may be connected thereto in a frictionally locking fashion.

In other practical developments it may be provided that a plurality of bores are made to extend axially through the flange and are aligned with bores which are made to extend axially through the external ring, wherein screw bolts for producing a frictionally locking connection of the external ring of the roller bearing to the rotor hub may be made to extend through the bores.

Another embodiment of the invention provides that an external casing of the rotor hub opens into a radially outwardly directed rim which has a plurality of axial bores which are aligned with bores in the machine carrier, wherein the machine carrier is arranged axially and radially on the outside of the gondola of the wind power plant. This embodiment can be supplemented by virtue of the fact that screw bolts may be made to extend through the bores in the aforementioned rim of the rotor hub and through the bores in the machine carrier, by means of which screw bolts the rotor hub can be connected in a frictionally locking fashion to the machine carrier.

In one particularly practical development of the invention there is provision that the roller bearing is a bearing of the torque bearing design.

The object of making available a method for replacing a bearing arrangement of a wind power plant is solved with a method which comprises the following steps:
attachment of the rotor hub to a machine carrier which is arranged radially and axially on the outside of a gondola,
release of the connection of the rotor hub and bearing outer ring,
pulling off of the roller bearing forward out of a cylindrical opening of the rotor hub, and
insertion of another roller bearing in the reverse sequence.

In this way, a very simple and advantageous method for mounting or dismounting the main bearing of a wind power plant is made available which is significantly simplified compared to the previously known methods. This is because making all the significant features accessible from the outside or from the front of the wind power plant makes it possible for a main bearing of a wind power plant to be replaced significantly more quickly and cost-effectively than hitherto.

BRIEF DESCRIPTION OF THE DRAWINGS

A preferred embodiment of the bearing arrangement which is embodied according to the invention is explained in more detail below with reference to the appended drawings, in which.

DETAILED DESCRIPTION OF THE DRAWINGS

Figure 1:
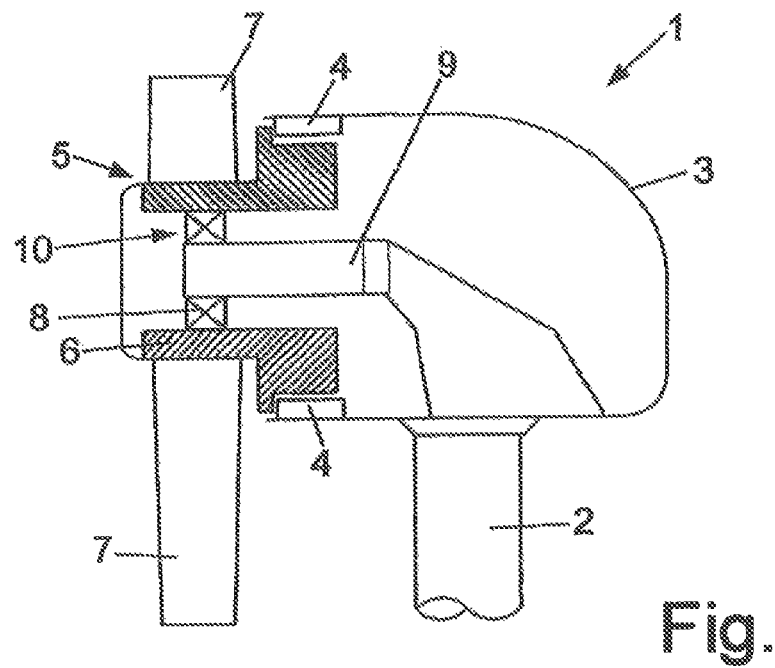
FIG. 1 shows a sectional view through a wind power plant with a bearing arrangement according to the invention in a partial view.

FIG. 1 is a schematic representation of a wind power plant 1 in a partial sectional view. The wind power plant 1 is provided with a gondola 3 which is mounted so as to be rotatable by 360° on a tower 2. Inside the gondola 3, machine carriers 4 are arranged radially and axially on the outside in the vicinity of the rotor, and the significant functional parts (not illustrated in more detail), such as an electrical generator, speed-transforming gear mechanism and the like, are positioned there. The generator is driven by a rotor 5 via the gear mechanism and generates electrical current which is fed into a power network via electrical lines (likewise not illustrated in more detail).

The rotor 5 comprises essentially a rotor hub 6 to the radial circumference of which a plurality of rotor blades 7 are attached, which rotor blades 7 cause the rotor 5 to rotate as a result of wind passing over them. A roller bearing 8 is inserted, as a main bearing of the rotor 5, in a coaxial direction into the rotor hub 6, which main bearing connects the rotor hub 6 in a rotatable fashion to a rotationally fixed axle which is embodied as a hollow shaft 9. The connection of the roller bearing 8 to the rotor hub 6 forms the bearing arrangement 10 according to the invention, which is illustrated in detail in FIGS. 2 and 3.

Figure 2:
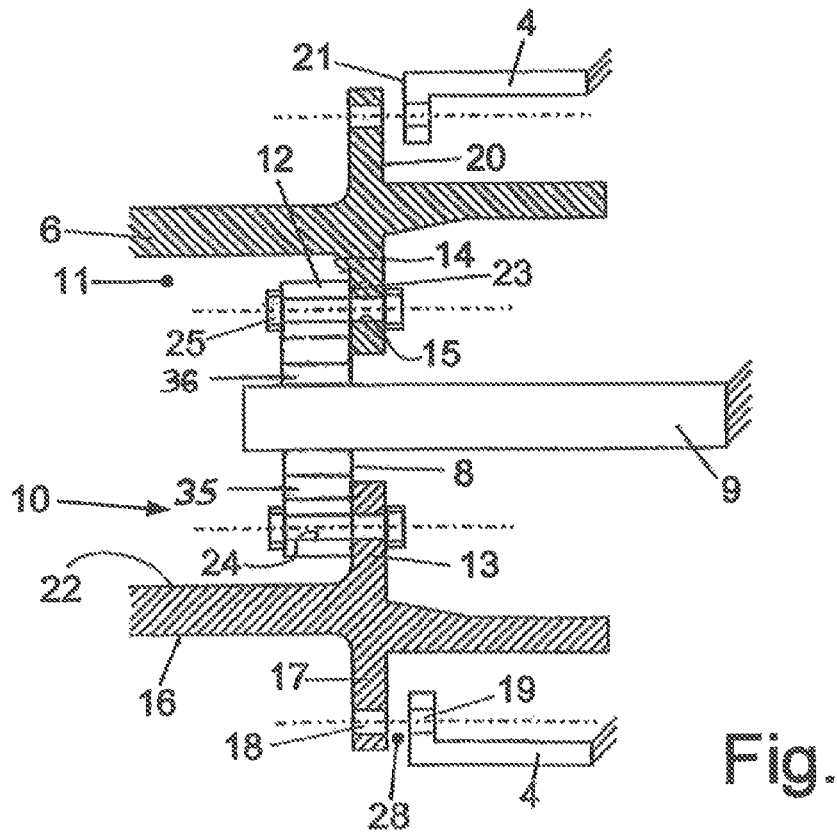
FIG. 2 shows a longitudinal section through the bearing arrangement according to the invention in a partial view in the mounted state.

In FIG. 2, the bearing arrangement 10 is illustrated in longitudinal section in the mounted state, that is to say in the state in which the rotor hub 6 can rotate freely. The rotor hub 6 has a cylindrical opening 11 which is accessible from the axially outer direction and into which the roller bearing 8 is inserted. The roller bearing 8 has an external ring 12, an internal ring 36 (schematically shown) and roller bodies 35 (schematically shown) which are arranged between the rings and are, for example, in the form of tapered rollers. The internal ring is arranged on the hollow shaft 9 in a rotationally fixed fashion.

The rotor hub 6 has, at an axially inner end of the cylindrical opening 11, a stop in the form of a radially inwardly protruding, circumferential flange 13 with an axially outer end side 14, through which a plurality of axial bores 15 are guided. An external casing 16 of the rotor hub 6 opens into a radially outwardly directed rim 17, which is spaced apart axially from the machine carrier 4 while maintaining a small radial gap 28, and has a plurality of axial bores 18. These bores 18 are located at the same radial height as axial bores 19 in the machine carrier 4. In the normal operating state of the wind power plant 1, an axial distance remains accordingly between an axially inner end side 20 of the rim 17 of the rotor hub 6 and an axially outer end side 21 of the machine carrier 4.

The roller bearing 8 is dimensioned in such a way that the diameter of the external ring 12 is smaller than the diameter of an internal casing 22 of the rotor hub 6. An axially inner end side 23 of the external ring 12 bears against the axially outer end side 14 of the edge 13, specifically in such a way that bores 24 which are made to extend axially through the external ring 12 are aligned with the axial bores 15 in the flange 13.

Screw bolts 25 are made to extend through these bores 15, 24 and hold the external ring 12 against the rotor hub 6 in a frictionally locking fashion.

Figure 3:
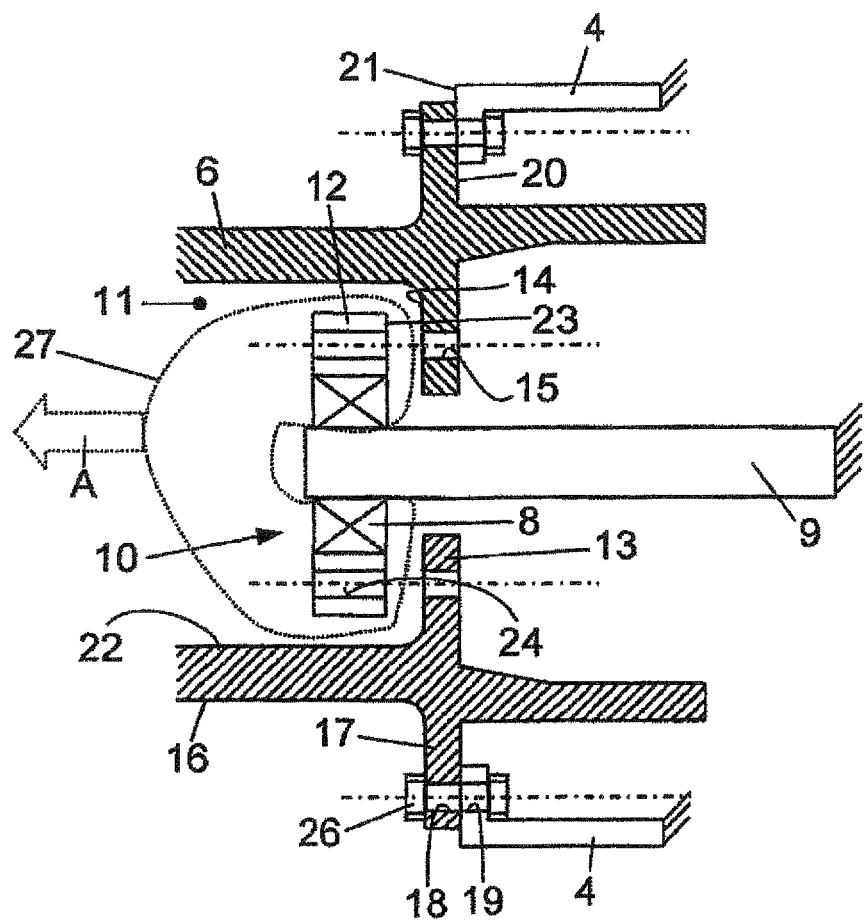
FIG. 3 shows a longitudinal section through the bearing arrangement according to FIG. 2 in a partially dismounted state.

FIG. 3 illustrates the bearing arrangement 10 in longitudinal section in a partially dismounted state. In order to be able to dismount or mount the bearing arrangement, the rotor hub 6 is first secured to the machine carrier 4. For this purpose, screw bolts 26 are inserted into the bores 18 in the rim 17 of the rotor hub 6 and into the bores 19 in the machine carrier 4 and tightened, as a result of which the rotor hub 6 is displaced axially toward the machine carrier 4 until the axially inner end side 20 of the rim 17 of the rotor hub 6 bears against the end side 21 of the machine carrier 4. According to another variant it is also possible to plug spacer pieces into the gap 28 according to FIG. 2 in order to then insert the screw bolts 26 into the bores 18, 19 and tighten them. It is then not necessary to displace the rotor hub 6 axially when tightening the screw bolts 26. As soon as the screw bolts 26 are tightened, the rotor hub 6 is held by the machine carrier 4, and the roller bearing 8 can then be pulled out of the rotor hub 6 axially outward or forward, in the direction of the arrow A.

For this purpose, the screw bolts 25 (not illustrated in FIG. 3), with which the external ring 12 is secured to the flange 13 of the rotor hub 6, are firstly released and removed. The roller bearing 8 is then removed forward out of the rotor hub 6 in the direction of the arrow A with a suitable detachment tool, indicated by the dotted line 27. A new roller bearing 8 is then in turn inserted from the front into the cylindrical opening 11 of the rotor hub 6 and connected in the previously described fashion to the rotor hub 6, after which the screw bolts 26 between the machine carrier 4 and the rotor hub 6 are released and the correct distance between the rotor hub 6 and machine carrier 4 is restored.

This provides a bearing arrangement 10 which can be very easily removed from a wind power plant or installed in a wind power plant, with the result that the expenditure on machinery for replacing a main bearing of a wind power plant can be drastically reduced since the main bearing can be detached forward and outward, while a main bearing could hitherto only be removed in the rearward direction, that is to say toward the interior of the gondola, which entailed considerable expenditure due to the drive-generating and current-generating further installations arranged there. The roller bearing 8 which is used for the bearing arrangement 10 which is embodied according to the invention is preferably a tapered roller bearing.

LIST OF REFERENCE NUMERALS

1 Wind power plant
2 Tower
3 Gondola
4 Machine carrier
5 Rotor
6 Rotor hub
7 Rotor blade
8 Roller bearing
9 Hollow shaft
10 Bearing arrangement
11 Cylindrical opening
12 External ring
13 Flange
14 End side
15 Axial bore
16 External casing of the rotor hub 6
17 Rim
18 Axial bore
19 Axial bore
20 End side of the rim 17
21 End side of the machine carrier 4
22 Internal casing of the rotor hub 6
23 Axially inner end side of the external ring 12
24 Bore
25 Screw bolts
26 Screw bolts
27 Detachment tool
28 Gap
A Arrow; detachment direction

The invention claimed is:

1. A bearing arrangement of a rotor of a wind power plant, comprising:
   a rotor hub with at least one rotor blade; and
   a roller bearing by means of which the rotor hub is mounted so as to be rotatable with respect to a machine carrier in a gondola of the wind power plant,
   wherein the roller bearing has an external ring and an internal ring, between which roller bodies are arranged,
   wherein the roller bearing is arranged coaxially in an axially externally open cylindrical opening in the rotor hub, the cylindrical opening being open at least on a side of the rotor hub directed away from the gondola of the wind plant, and
   wherein the external ring of the roller bearing is directly connected to the rotor hub in a rotationally fixed and releasable fashion.

2. The bearing arrangement of claim 1,
   wherein the rotor hub has, at an axially inner end of the cylindrical opening, a radially inwardly protruding flange with an axially outer end side, and in that an axially inner end side of the external ring bears against the axially outer end side of the flange and can be connected thereto in a frictionally locking fashion.

3. The bearing arrangement of claim 2,
   wherein a plurality of bores are made to extend axially through the radially inwardly protruding flange and are aligned with bores which are made to extend axially through the external ring, and
   wherein screw bolts for producing a frictionally locking connection of the external ring to the rotor hub can be made to extend axially through the bores in the radially inward protruding flange and through the bores in the external ring.

4. The bearing arrangement of claim 1,
   wherein an external casing of the rotor hub opens into a radially outwardly directed rim which has a plurality of axial bores which are aligned with bores in the machine carrier, and
   wherein the machine carrier is arranged axially and radially on the outside of the gondola of the wind power plant.

5. The bearing arrangement of claim 4,
   wherein screw bolts can be made to extend through the axial bores in the rim and through the bores in the machine carrier, and by means of the screw bolts the rotor hub can be connected in a frictionally locking fashion to the machine carrier.

6. A method for replacing a bearing arrangement of a wind power plant having a rotor bearing arrangement comprising a rotor hub with at least one rotor blade, a roller bearing by which the rotor hub is mounted so as to be rotatable with respect to a machine carrier in a gondola of the wind power plant, wherein the roller bearing has an external ring and is arranged coaxially in an axially externally open cylindrical opening in the rotor hub, and wherein the external ring of the roller bearing is connected to the rotor hub in a rotational fixed and releasable fashion, the method having the following steps:
- attaching the rotor hub to a machine carrier which is arranged radially and axially on the outside of a gondola;
- releasing a connection of the rotor hub and bearing external ring;
- detaching the roller bearing forward out of a cylindrical opening of the rotor hub; and
- inserting another roller bearing in a reverse sequence.

* * * * *

UNITED STATES PATENT AND TRADEMARK OFFICE
CERTIFICATE OF CORRECTION

PATENT NO. : 8,545,186 B2  Page 1 of 1
APPLICATION NO. : 12/682118
DATED : October 1, 2013
INVENTOR(S) : Loeschner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Fifteenth Day of September, 2015

Michelle K. Lee
*Director of the United States Patent and Trademark Office*